(12) United States Patent
Ogawa et al.

(10) Patent No.: US 7,349,304 B2
(45) Date of Patent: Mar. 25, 2008

(54) INFORMATION STORAGE MEDIUM EVALUATION METHOD, INFORMATION STORAGE MEDIUM EVALUATION APPARATUS, INFORMATION STORAGE MEDIUM, INFORMATION REPRODUCTION APPARATUS, INFORMATION REPRODUCTION METHOD, AND INFORMATION RECORDING METHOD

(75) Inventors: Akihito Ogawa, Yokohama (JP); Yuji Nagai, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 618 days.

(21) Appl. No.: 10/797,128

(22) Filed: Mar. 11, 2004

(65) Prior Publication Data

US 2004/0240344 A1 Dec. 2, 2004

(30) Foreign Application Priority Data

Mar. 12, 2003 (JP) ............................. 2003-067111

(51) Int. Cl.
*G11B 7/005* (2006.01)
(52) U.S. Cl. .............................. 369/47.28; 369/47.27; 369/53.22; 369/53.33
(58) Field of Classification Search ............. 369/53.22, 369/53.33, 47.27, 47.28
See application file for complete search history.

(56) References Cited

U.S. PATENT DOCUMENTS

| | | | | |
|---|---|---|---|---|
| 5,862,123 A | * | 1/1999 | Horie et al. ............. | 369/275.4 |
| 5,999,504 A | * | 12/1999 | Aoki ....................... | 369/47.4 |
| 6,487,164 B1 | * | 11/2002 | Endoh et al. ............ | 369/275.4 |
| 2002/0051416 A1 | * | 5/2002 | Suzuki .................... | 369/59.12 |
| 2002/0131352 A1 | * | 9/2002 | Kuribayashi et al. .... | 369/47.17 |
| 2003/0103429 A1 | * | 6/2003 | Senshu .................... | 369/47.24 |

FOREIGN PATENT DOCUMENTS

| | | |
|---|---|---|
| CN | 1236943 | 12/1999 |
| JP | 10-283738 | 10/1998 |

OTHER PUBLICATIONS

ECMA International, Standardizing Information and Communication Systems, No. 337, XP-002285700, pp. 1-108 "Standard ECMA-337: Data Interchange on 120mm and 80mm Optical Disk Using +RW Format-Capacity: 4,7 and 1,46 Gbytes Per Side", Dec. 2002.
U.S. Appl. No. 10/797,128, filed Mar. 11, 2004, Ogawa et al.
U.S. Appl. No. 10/761,361, filed Jan. 22, 2004, Ogawa et al.
U.S. Appl. No. 10/796,131, filed Mar. 10, 2004, Nagai et al.

* cited by examiner

*Primary Examiner*—Wayne Young
*Assistant Examiner*—Thomas Alunkal
(74) *Attorney, Agent, or Firm*—Oblon, Spivak, McClelland, Maier & Neustadt, P.C.

(57) ABSTRACT

An information storage medium according to an aspect of this invention has an information storage area for storing information, and a wobbled track which is used to guide a light beam on the information storage area, and is wobbled in correspondence with a frequency, a phase of which is modulated at predetermined timings to reflect predetermined information. The wobbled track is formed so that an evaluation result based on the frequency characteristics of a squared reproduction signal obtained by squaring a reproduction signal corresponding to the wobbled track, obtained from the reflected light of a light beam with which the wobbled track is irradiated, meets a predetermined evaluation measure.

6 Claims, 13 Drawing Sheets

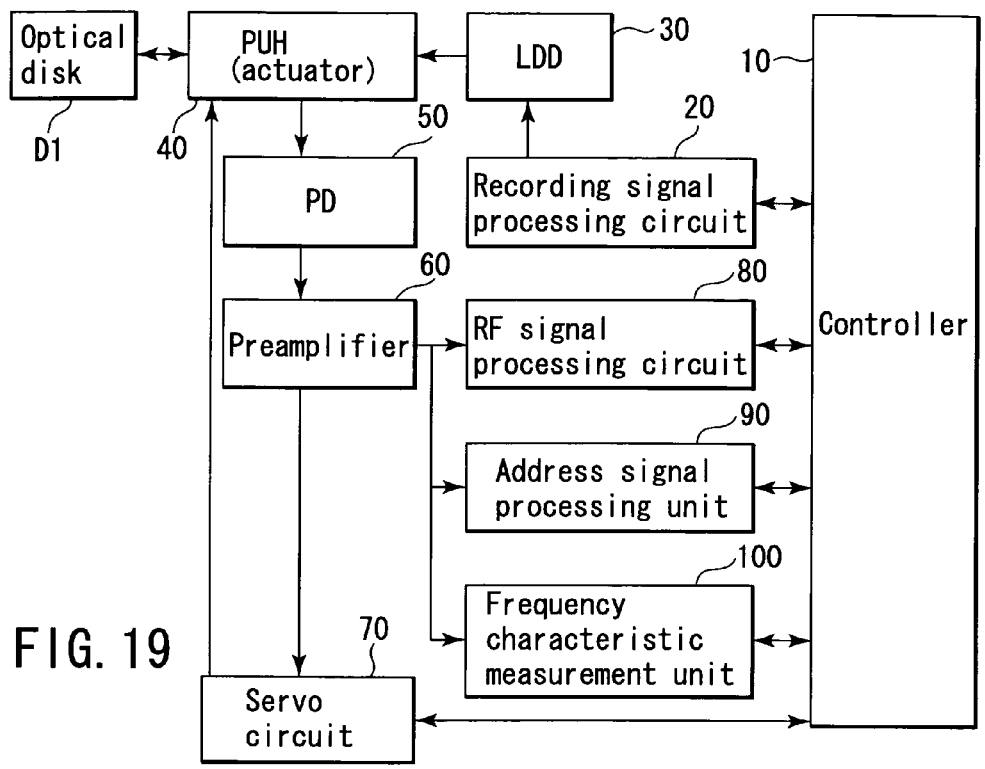
FIG. 19
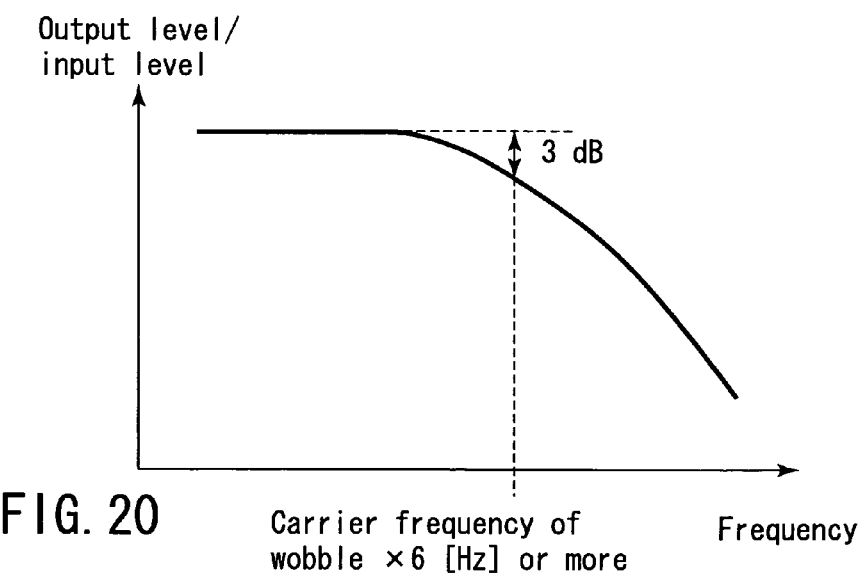
FIG. 20  Carrier frequency of wobble ×6 [Hz] or more    Frequency

INFORMATION STORAGE MEDIUM EVALUATION METHOD, INFORMATION STORAGE MEDIUM EVALUATION APPARATUS, INFORMATION STORAGE MEDIUM, INFORMATION REPRODUCTION APPARATUS, INFORMATION REPRODUCTION METHOD, AND INFORMATION RECORDING METHOD

CROSS-REFERENCE TO RELATED APPLICATIONS

This application is based upon and claims the benefit of priority from the prior Japanese Patent Application No. 2003-67111, filed Mar. 12, 2003, the entire contents of which are incorporated herein by reference.

BACKGROUND OF THE INVENTION

1. Field of the Invention

The present invention relates to an information storage medium such as an optical disk formed with a wobbled track. The present invention also relates to an information storage medium evaluation method and information storage medium evaluation apparatus, which evaluate the quality of such information storage medium. The present invention relates to an information reproduction apparatus and information reproduction method, which reproduce information from such information storage medium. Furthermore, the present invention relates to an information recording apparatus for recording information on such information storage medium.

2. Description of the Related Art

As is well known, in recent years, optical disks having a single-layer/single-sided size of 4.7 GB are commercially available as those which can achieve high-density recording of information. For example, a DVD-ROM as a read-only optical disk, and a rewritable DVD+RW (ECMA-337), DVD-RW (ECMA-338), and DVD-RAM (ECMA-330) are available.

An information recording layer is formed on a transparent substrate on each of these optical disks. An information recording layer of such optical disk has a guide groove called a "groove". Recording/reproduction of information on/from an optical disk is made along this guide groove. By focusing a laser beam on the guide groove of the information recording layer, information is recorded on this guide groove or information recorded on that guide groove is reproduced.

For example, physical addresses used to specify a spatial position where information is to be recorded/reproduced are recorded on the DVD-RAM. For example, these physical addresses are formed to obstruct the guide groove.

By contrast, on a +RW disk, physical addresses are reflected on the guide groove using groove wobble modulation (to be referred to as wobble modulation hereinafter) that radially slightly wobbles the guide groove. This method changes the wobble phase in correspondence with information to be recorded (physical address), and its technique is disclosed in, e.g., Jpn. Pat. Appln. KOKAI Publication No. 10-283738. Physical addresses which are recorded by such wobble modulation do not obstruct the recording track. That is, the physical addresses recorded by wobble modulation do not limit the recording area of user information on a disk. Hence, wobble modulation can assure high format efficiency, and can easily achieve compatibility to read-only media.

As an evaluation measure of the quality of a wobble signal formed by optically reproducing the groove wobbles, the Narrow Band Signal to Noise Ratio (NBSNR) of the wobble signal is known. This value is used to evaluate the ratio of the amplitude of a carrier that carries the wobble signal to that of noise, and indicates a higher demodulation ratio with increasing NBSNR. This NBSNR is also called a Carrier to Noise Ratio (CNR).

Normally, the NBSNR of a wobble signal is measured by inputting a wobble signal to a frequency component analysis device such as a spectrum analyzer or the like, and calculating the difference between the peak value of a carrier frequency and the noise level near the carrier frequency. However, when the wobble signal contains modulated components, the peak value of the carrier frequency becomes lower than the actual one. Also, the frequency of the modulated components raises the signal level near the carrier frequency. Hence, when the wobble signal contains modulated components, the NBSNR of the wobble signal cannot be accurately measured.

On the other hand, a wobble signal obtained from a +RW disk contains two different components, i.e., non-modulated and modulated components, and most of components are non-modulated components. For this reason, the NBSNR of the wobble signal can be measured by practically disregarding modulated components. However, when a modulated region is reduced, an information size that can be recorded becomes smaller. Hence, when a recording capacity of information by wobble modulation is increased, this method cannot be used.

In order to maintain a high-quality wobbled track, the NBSNR of a wobble signal must be accurately measured. If the NBSNR of the wobble signal cannot be accurately measured, the quality of a wobble track may deteriorate. If a wobble track has poor quality, physical address information reflected on the wobble track cannot be normally reproduced. Hence, correct information may not consequently reproduced from a disk. Likewise, correct information may not be recorded on a disk.

BRIEF SUMMARY OF THE INVENTION

According to embodiments of the present invention, there is provided an information storage medium evaluation method for evaluating an information storage medium, which comprises a wobbled track that is used to guide a light beam and is wobbled in correspondence with a frequency, a phase of which is modulated at predetermined timings to reflect predetermined information, comprising squaring (double-multiplying) a reproduction signal corresponding to the wobbled track, obtained from reflected light of the light beam with which the wobbled track is irradiated, and evaluating quality of the wobbled track on the basis of frequency characteristics of the squared (double-multiplied) reproduction signal.

According to embodiments of the present invention, there is provided an information storage medium evaluation apparatus for evaluating an information storage medium, which comprises a wobbled track that is used to guide a light beam and is wobbled in correspondence with a frequency, a phase of which is modulated at predetermined timings to reflect predetermined information, comprising a detection unit configured to detect reflected light of a light beam with which the wobbled track formed on the information storage medium is irradiated, a filter unit configured to suppress noise from a reproduction signal corresponding to the wobbled track on the basis of the reflected light detected by the detection unit, a squaring unit configured to square the reproduction signal from which the noise is suppressed by the filter unit, and an evaluation unit configured to evaluate quality of the wobbled track on the basis of frequency characteristics of the squared reproduction signal squared by the squaring unit.

According to embodiments of the present invention, there is provided an information storage medium for storing information, comprising an information storage area for storing information, and a wobbled track which is used to guide a light beam on the information storage area, and is wobbled in correspondence with a frequency, a phase of which is modulated at predetermined timings to reflect predetermined information, wherein the wobbled track is formed so that when a reproduction signal corresponding to the wobbled track obtained from reflected light of a light beam, with which the wobbled track is irradiated, is squared, and the squared reproduction signal is evaluated on the basis of frequency characteristics of the squared reproduction signal, a difference between peak and noise levels obtained from the frequency characteristics of the squared reproduction signal becomes not less than 17 dB.

According to embodiments of the present invention, there is provided an information reproduction apparatus for reproducing information from an information storage medium on which a wobbled track, which is wobbled at a frequency, a phase of which is modulated at predetermined timings to reflect predetermined information, is formed, so that an evaluation result based on frequency characteristics of a squared reproduction signal obtained by squaring a reproduction signal corresponding to the wobbled track, obtained from reflected light of a light beam with which the wobbled track is irradiated, meets a predetermined evaluation measure, comprising a detection unit configured to detect the reflected light of the light beam with which the wobbled track formed on the information storage medium is irradiated, and a reproduction unit configured to reproduce the predetermined information reflected on the wobbled track on the basis of the reflected light detected by the detection unit.

According to embodiments of the present invention, there is provided an information reproduction method for reproducing information from an information storage medium on which a wobbled track, which is wobbled at a frequency, a phase of which is modulated at predetermined timings to reflect predetermined information, is formed, so that an evaluation result based on frequency characteristics of a squared reproduction signal obtained by squaring a reproduction signal corresponding to the wobbled track, obtained from reflected light of a light beam with which the wobbled track is irradiated, meets a predetermined evaluation measure, comprising detecting the reflected light of the light beam with which the wobbled track formed on the information storage medium is irradiated, and reproducing the predetermined information reflected on the wobbled track on the basis of the detected reflected light.

According to embodiments of the present invention, there is provided an information recording method for recording information on an information storage medium on which a wobbled track, which is wobbled at a frequency, a phase of which is modulated at predetermined timings to reflect predetermined information, is formed, so that an evaluation result based on frequency characteristics of a squared reproduction signal obtained by squaring a reproduction signal corresponding to the wobbled track, obtained from reflected light of a light beam with which the wobbled track is irradiated, meets a predetermined evaluation measure, comprising detecting the reflected light of the light beam with which the wobbled track formed on the information storage medium is irradiated, reproducing the predetermined information reflected on the wobbled track on the basis of the detected reflected light, and recording information on the information storage medium on the basis of the reproduced predetermined information.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 19 is a block diagram showing an example of a reproduction signal evaluation apparatus;

FIG. 20 is a graph showing an example of the relationship between the input/output ratio of a wobble signal in a multiplier circuit, and the frequency;

DETAILED DESCRIPTION OF THE INVENTION

A preferred embodiment of the present invention will be described hereinafter with reference to the accompanying drawings.

Figure 1:
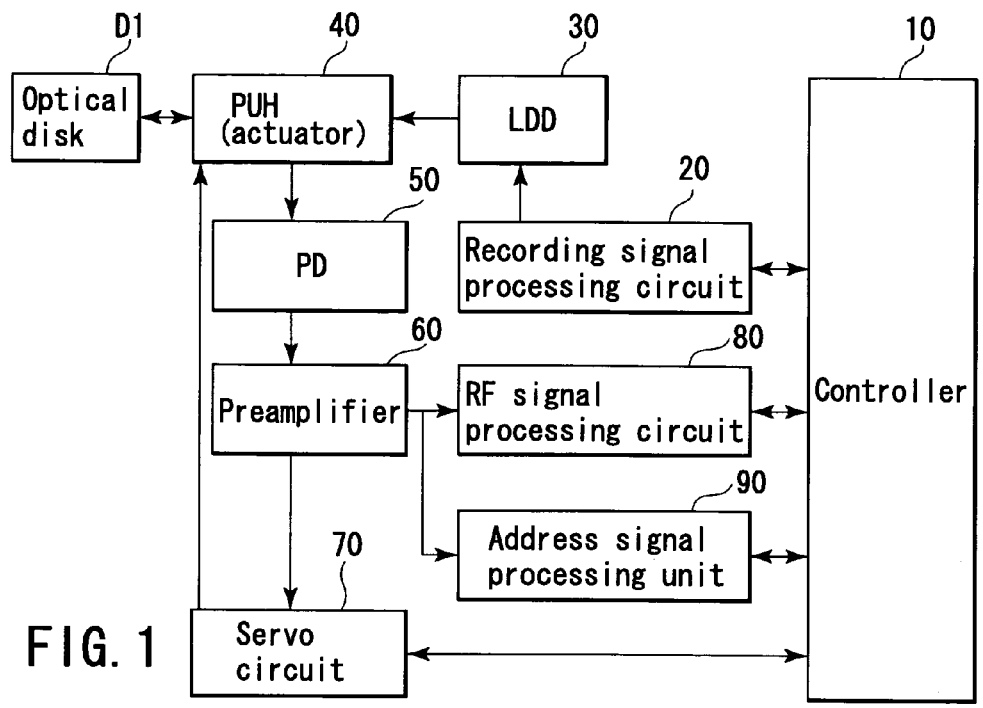
FIG. 1 is a schematic block diagram showing the arrangement of an optical disk apparatus (information recording/reproduction apparatus) according to an embodiment of the present invention.

FIG. 1 is a schematic block diagram showing the arrangement of an optical disk apparatus according to an embodiment of the present invention. The optical disk apparatus shown in FIG. 1 serves as an information reproduction apparatus and also an information recording apparatus. That is, this optical disk apparatus records recording data on an optical disk D1 and reproduces recording data recorded on the optical disk D1.

As shown in FIG. 1, the optical disk apparatus comprises a controller 10, recording signal processing circuit 20, laser driver (LDD) 30, pickup head (PUH) 40, photodetector (PD) 50, preamplifier 60, servo circuit 70, RF signal processing circuit 80, address signal processing unit 90, and the like.

This optical disk apparatus records/reproduces information by focusing a laser beam emitted by the PUH 40 on an information recording layer of the optical disk D1. Light reflected by optical disk D1 passes through an optical system of the PUH 40, and is detected as an electrical signal by the PD 50.

The PD 50 has two or more photodetection elements. A signal obtained by summing of a plurality of electrical signals detected by respective elements is called a sum signal, and a signal obtained by subtraction of a plurality of electrical signals detected by respective elements is called a difference signal. Especially, a sum signal appended with high-frequency information such as user information or the like is called an RF signal. Also, a signal obtained by subtraction of signals obtained from respective elements which are optically arranged in the radial direction of the optical disk is called a radial push-pull signal.

Figure 2:
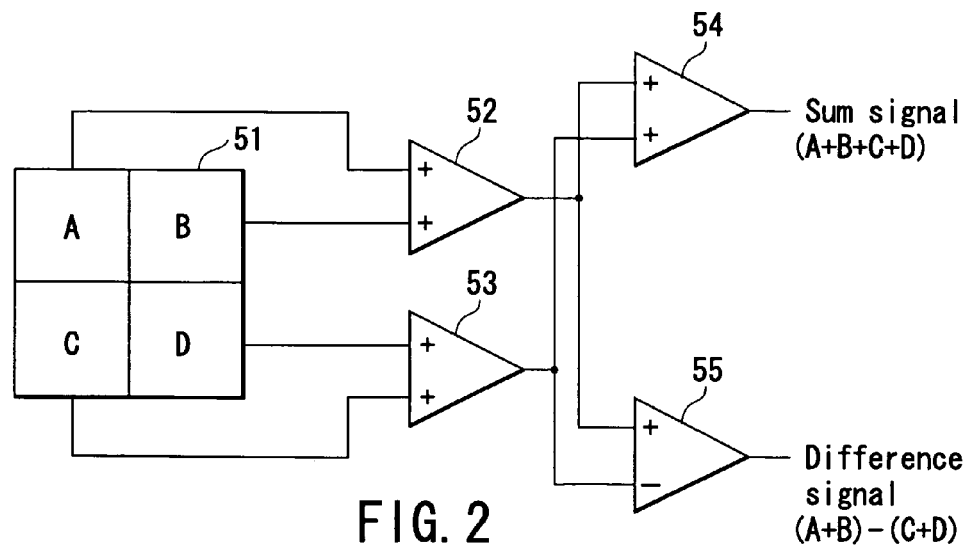
FIG. 2 is a diagram showing an example of a 4-split PD.

FIG. 2 shows an example of a 4-split PD. As shown in FIG. 2, the PD 50 comprises 4-split photodetection elements 51, adders 52, 53, and 54, and a subtractor 55. Two out of four signals detected by the photo-detection elements 51 are added by the adder 52, and the remaining two signals are added by the adder 53. The adder 54 adds the sum signals output from the adders 52 and 53 to generate a sum signal. That is, the sum signal is obtained by adding all four signals detected by the photodetection elements 51. On the other hand, the subtractor 55 subtracts the sum signal output from the adder 53 from that output from the adder 52 to generate a difference signal. This difference signal is a radial push-pull signal.

The electrical signals detected by the PD 50 are amplified by the preamplifier 60, and are sent to the servo circuit 70, RF signal processing circuit 80, and address signal processing unit 90.

The servo circuit 70 generates focusing, tracking, and tilt servo signals and the like on the basis of the electrical signals detected by the PD 50, and outputs these servo signals to focusing, tracking, and tilt actuators of the PUH 40.

The RF signal processing circuit 80 mainly processes the sum signal of the electrical signals detected by the PD 50 to reproduce recorded user information and the like. As a demodulation method in this case, a slice method or PRML (Partial Response Maximum Likelihood) method may be used.

The address signal processing unit 90 reads out physical address information indicating a recording position on the optical disk by processing the electrical signals detected by the PD 50, and outputs that information to the controller 10. The controller 10 reads out user information or the like at a desired position, or records user information or the like at a desired position on the basis of this address information. In this case, user information is modulated to a signal suited for optical disk recording by the recording signal processing circuit 20. For example, modulation rules such as (1, 10)RLL, (2, 10)RLL, and the like are applied. RLL is an abbreviation for run length limitation, and (1, 10)RLL is a rule for limiting the upper limit of the runlength of channel bits "0" to 10, and the lower limit of the runlength to 1. That is, on a disk which is recorded under the condition of (1, 10)RLL, channel bits "0" successively appear within the runlength range of 1 to 10. Likewise, on a disk which is recorded under the condition of (2, 10)RLL, channel bits "0" successively appear within the runlength range of 2 to 10.

Figure 3:
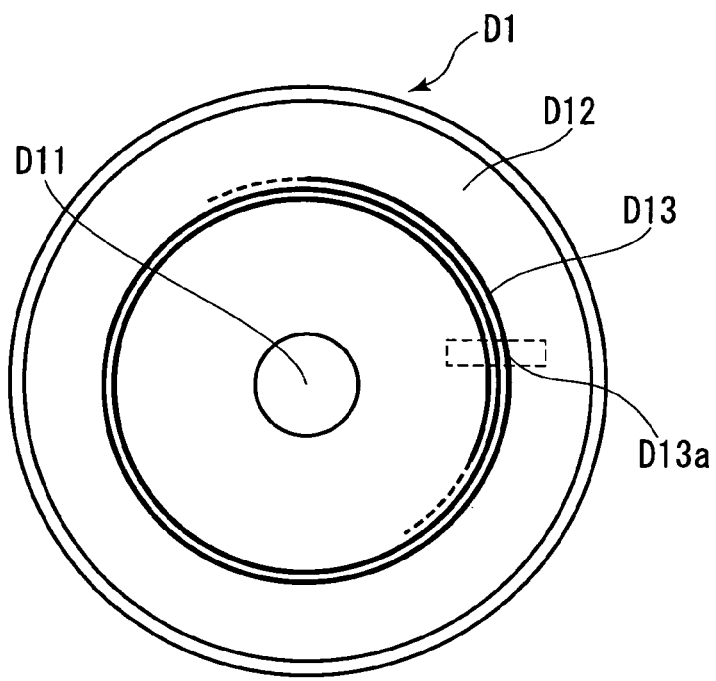
FIG. 3 shows a track and the like on an optical disk according the embodiment of the present invention.

The optical disk D1 according to an embodiment of the present invention comprises a transparent substrate, and an information recording layer stacked on this transparent substrate. As shown in FIG. 3, the optical disk D1 (information recording layer) includes an information recording area D12, which includes a guide groove (track D13) called a groove. The guide groove is called a track, and information recording/reproduction is made along this track. The track includes a spiral track D13 which continues from the inner periphery to the outer periphery of the disk, as shown in FIG. 3, and concentric tracks formed of a plurality of concentric circles.

Figure 4:
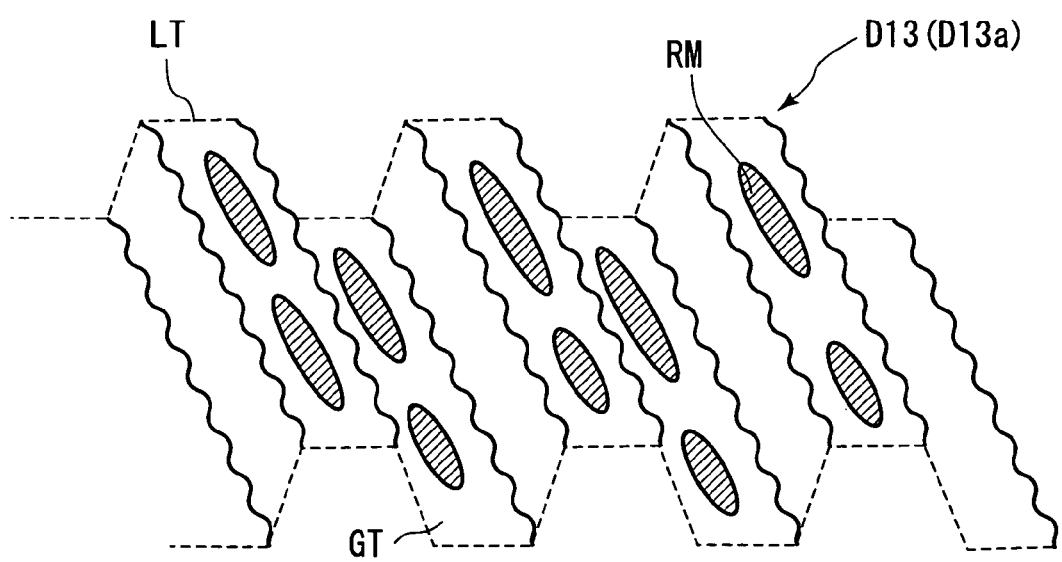
FIG. 4 is an enlarged view of a wobbled track formed on the optical disk according the embodiment of the present invention.

FIG. 4 shows a locally enlarged portion D13a of the track D13 shown in FIG. 3. As shown in FIG. 4, the track D13 is formed by concave and convex portions of the information recording layer. The concave portion is called a groove (groove track GT), and the convex portion is called a land (land track LT). As a recording method, a land-groove method, and groove (land) only method are available. FIG. 4 shows an example of the land-groove method. As shown in FIG. 4, the land-groove method records information (recording marks RM) on both the land track LT and groove track GT. By contrast, the groove (land) only recording method records information only on either type of track. The present invention can be applied to both the methods.

Figure 5:
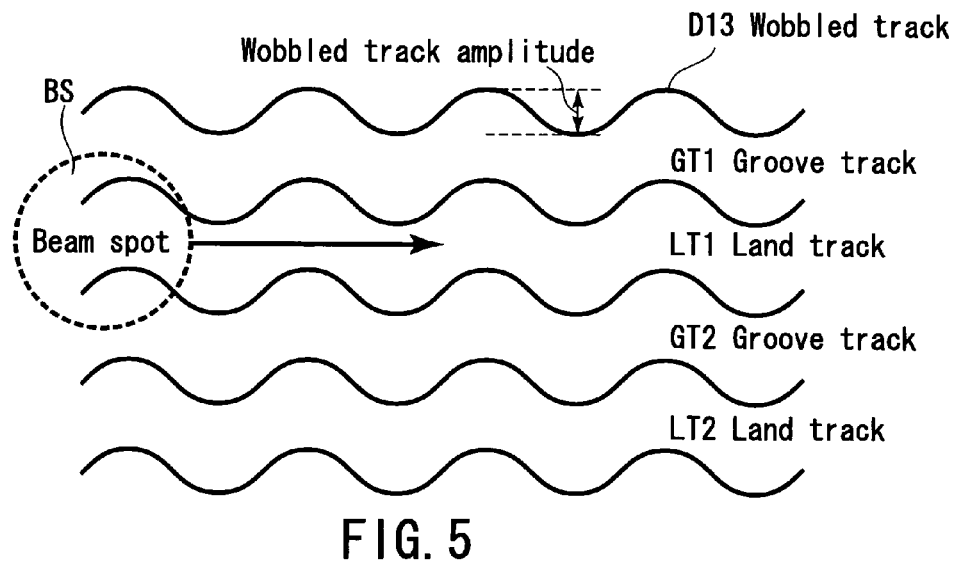
FIG. 5 is a top view of the wobbled track formed on the optical disk according the embodiment of the present invention.

FIG. 5 is a top view of the track formed on the optical disk. As shown in FIG. 5, groove and land tracks GT and LT are alternately formed. That is, a land track LT1 is formed between groove tracks GT1 and GT2, and a groove track GT2 is formed between land tracks LT1 and LT2.

Figure 6:
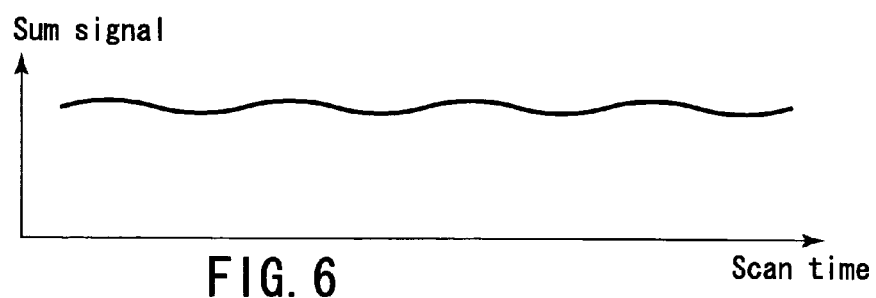
FIG. 6 is a graph showing an example of a sum signal output from the photodetector.
Figure 7:
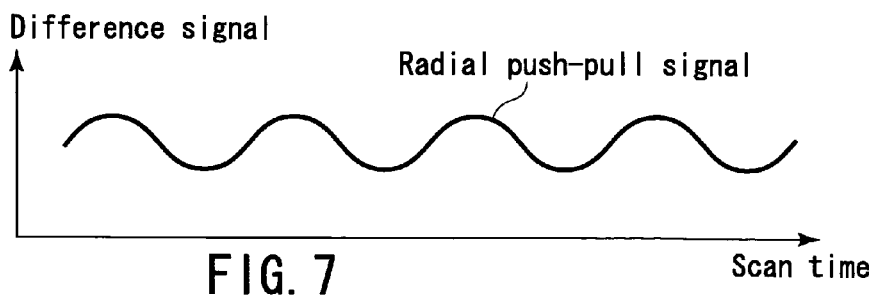
FIG. 7 is a graph showing an example of a difference signal (radial push-pull signal) output from the photodetector.

The track (groove and land tracks GT and LT) formed on the optical disk of the present invention slightly wobbles in the radial direction. Such track is called a wobbled track D13. By scanning a focused beam spot BS along this wobbled track D13, the beam spot goes nearly straight along the center of the wobbled track since the frequency of wobbles is higher than the frequency band of a tracking servo signal. At this time, the sum signal remains nearly unchanged, as shown in FIG. 6. By contrast, the difference signal in the radial direction, i.e., only the radial push-pull signal changes in correspondence with wobbles, as shown in FIG. 7. This signal is called a wobble signal. The wobble signal is used in adjustment of the rotation frequency of a spindle, reference of recording clocks, recording of physical address information, and the like.

Figure 8:
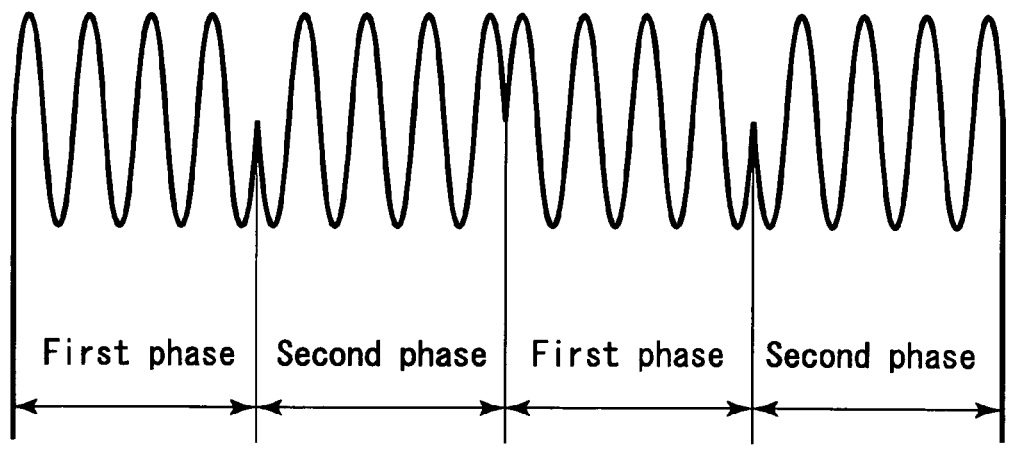
FIG. 8 is a chart showing an example in which the frequency of phase modulation is reflected on the entire track.
Figure 9:
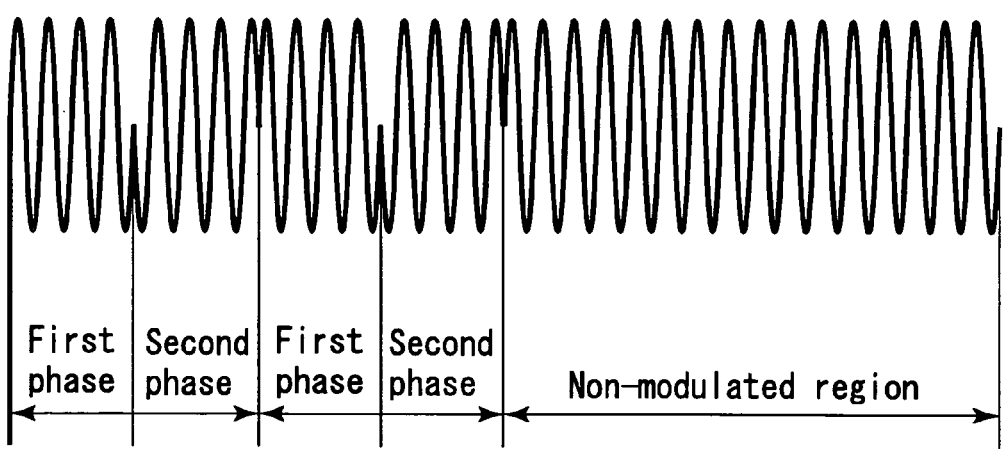
FIG. 9 is a chart showing an example in which the frequency of phase modulation is reflected on a part of the track.
Figure 10:
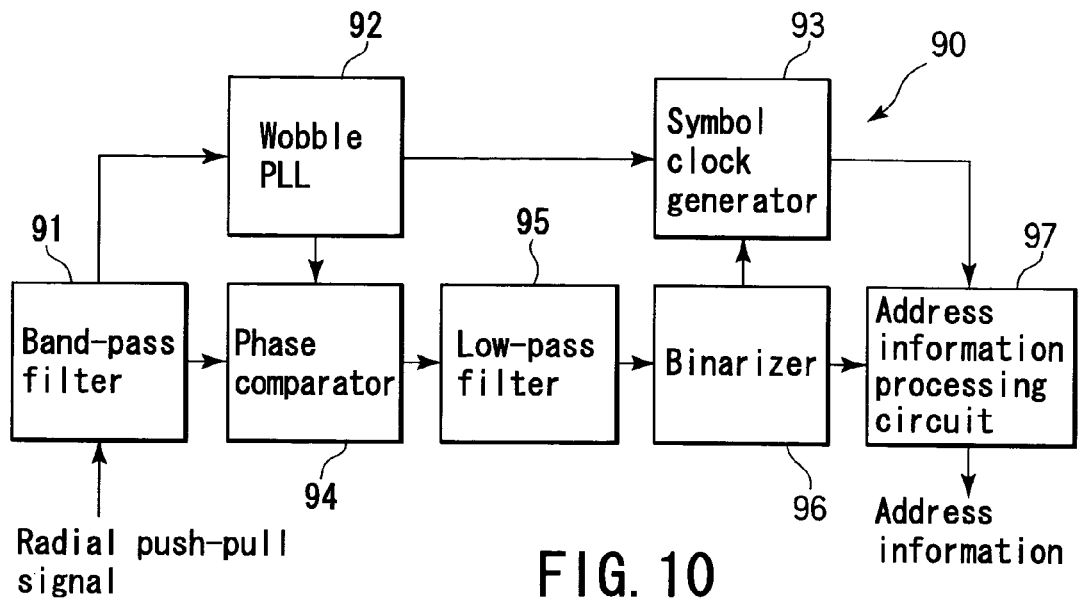
FIG. 10 is a schematic block diagram showing an example of the arrangement of an address signal processing unit shown in FIG. 1.

The optical disk of the present invention is formed with the wobbled track, which is wobbled in correspondence with a frequency, the phase of which is modulated at predetermined timings to reflect management information such as physical address information and the like. That is, management information such as physical address information and the like can be reproduced from a wobble signal obtained in correspondence with the wobbled track formed on the optical disk. For example, a wobbled track, which is wobbled in correspondence with a phase-modulated frequency, shown in FIG. 8 or 9, is formed. FIG. 8 shows an example in which the phase-modulated frequency is reflected over the entire track. FIG. 9 shows an example in which the phase-modulated frequency is reflected on given portions of the track, and a non-phase-modulated frequency is reflected on other portions. In either case, the address information processing unit 90 can read management information such as physical address information and the like reflected on the track. As shown in FIG. 10, the address information processing unit 90 comprises a band-pass filter 91, wobble PLL 92, symbol clock generator 93, phase comparator 94, low-pass filter 95, binarizer 96, and address information processing circuit 97. The address information processing unit 90 reads management information such as physical address information and the like reflected on the wobbled track from the radial push-pull signal supplied from the PD 50.

Figure 11:
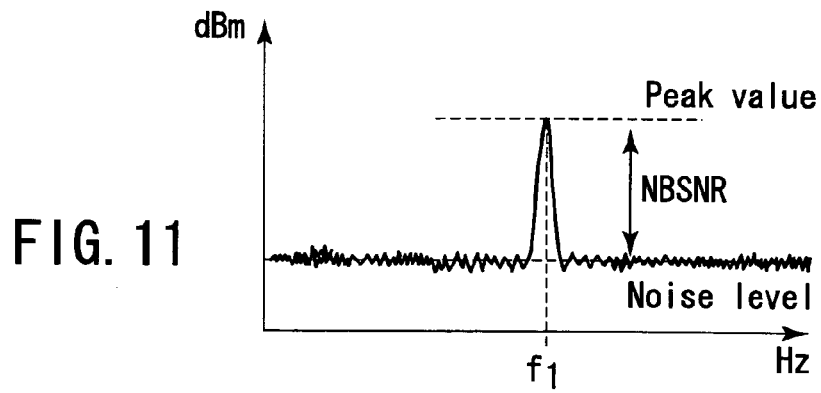
FIG. 11 is a graph showing an example of the frequency characteristics of a non-modulated, single-frequency wobble signal.

FIG. 11 shows the frequency characteristics of a non-modulated, single-frequency wobble signal. The frequency characteristics have a peak at a carrier frequency ($f_1$) of the wobble signal, and other portions correspond to noise components. As shown in FIG. 11, the NBSNR (or CNR) can be measured by calculating the difference between the peak value and noise level.

Figure 12:
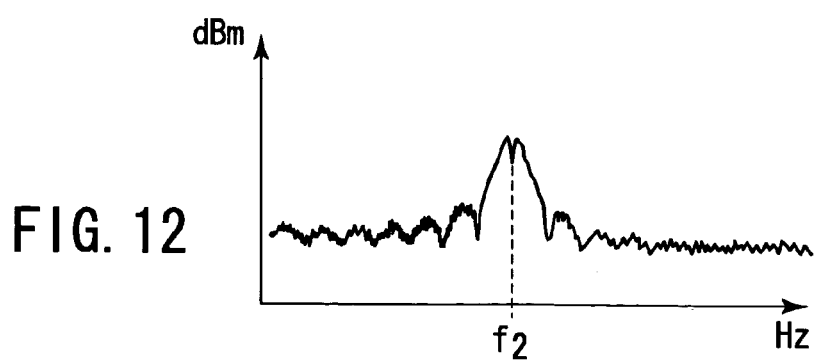
FIG. 12 is a graph showing an example of the frequency characteristics of a binary phase-modulated wobble signal in which the phase difference between symbols is about 180°.

FIG. 12 shows the frequency characteristics of a binary phase-modulated wobble signal in which the phase difference between symbols is about 180°. The frequency characteristics rise in the vicinity of a carrier frequency ($f_2$), but peaks are generated on the two sides of the carrier frequency and their peripheral portions of these peaks are also raised due to the influence of modulated components. Therefore, the NBSNR of the wobble signal cannot be measured unlike in FIG. 11.

Figure 13:
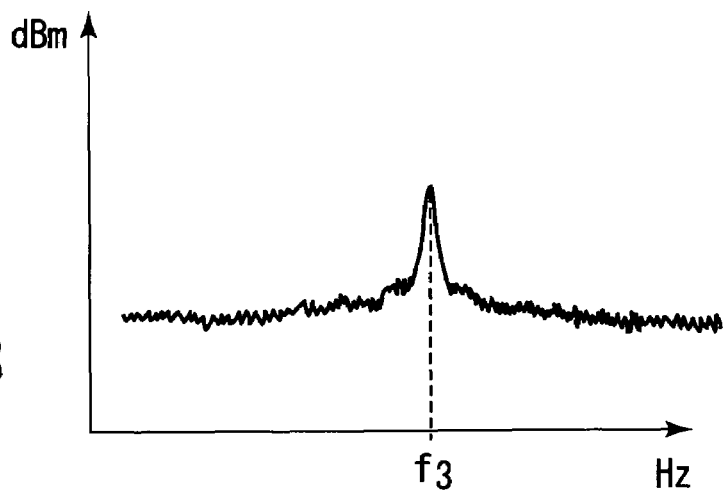
FIG. 13 is a graph showing an example of the frequency characteristics of a wobble signal which includes modulated and non-modulated regions at a ratio of 1:4.

FIG. 13 shows the frequency characteristics of a wobble signal which includes modulated and non-modulated regions at a ratio of 1:4. Since a long non-modulated region appears, the frequency characteristics have a peak at a carrier frequency ($f_3$), but the peak value is reduced and its peripheral portions are raised due to the influence of modulated components. Therefore, in this case, the NBSNR of the wobble signal cannot be accurately measured as in FIG. 12.

In order to accurately measure the NBSNR of the wobble signal, the present invention defines a NBSNR of squared wobble signal. This NBSNR of squared wobble signal indicates the difference between the noise level and a peak value which appears at a frequency twice the wobble carrier frequency from the frequency characteristics of the squared result of the wobble signal.

Figure 14:
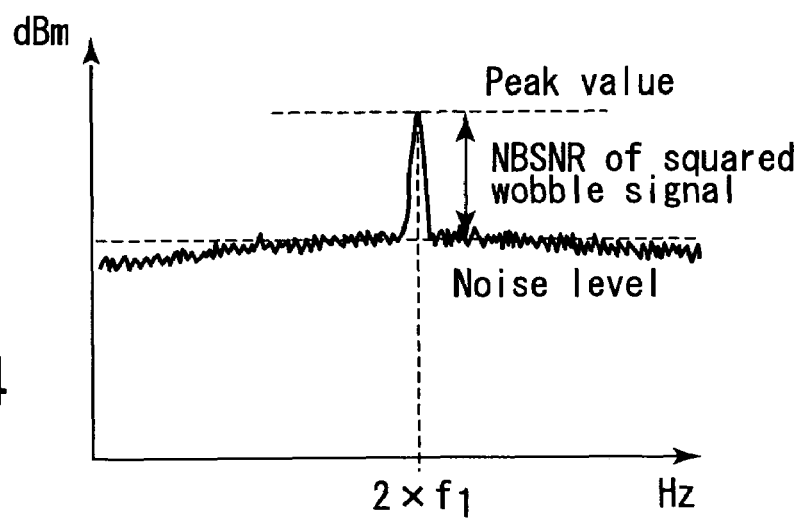
FIG. 14 is a graph showing an example of the frequency characteristics of a squared wobble signal obtained by squaring a non-modulated, single-frequency wobble signal.
Figure 15:
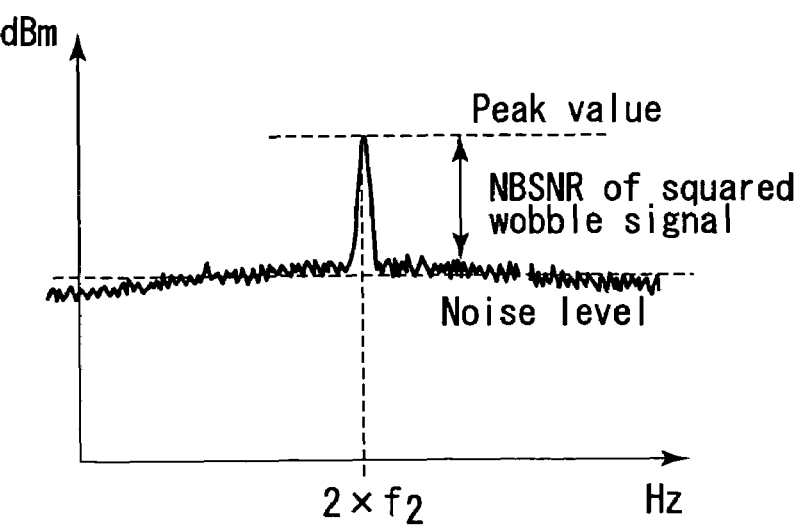
FIG. 15 is a graph showing an example of the frequency characteristics of a squared wobble signal obtained by squaring a binary phase-modulated wobble signal in which the phase difference between symbols is about 180°.
Figure 16:
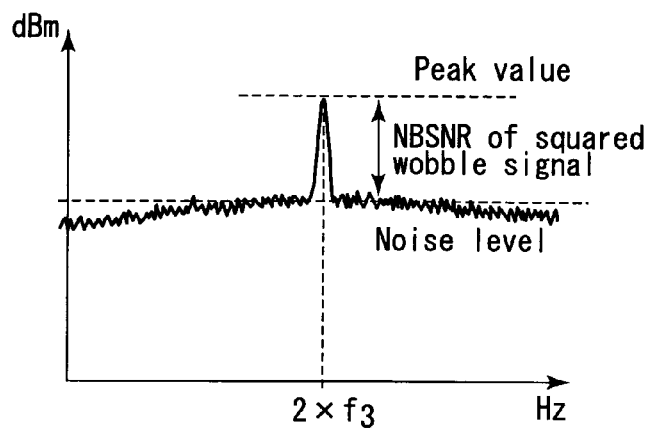
FIG. 16 is a graph showing an example of the frequency characteristics of a squared wobble signal obtained by squaring a locally modulated wobble signal.

FIG. 14 shows the frequency characteristics of a squared wobble signal obtained by squaring a non-modulated, single-frequency wobble signal. FIG. 15 shows the frequency characteristics of a squared wobble signal obtained by squaring a binary phase-modulated wobble signal in which the phase difference between symbols is about 180°. FIG. 16 shows the frequency characteristics of a squared wobble signal obtained by squaring a locally modulated wobble signal. As can be seen from FIGS. 14, 15, and 16, each squared wobble signal has simple frequency characteristics which have only one peak at $2 \times f_1$, $2 \times f_2$, or $2 \times f_3$. This is to extract only a carrier component of the wobble signal by squaring the wobble signal. Therefore, when the difference between the noise level and a peak value which appears at a frequency twice the carrier frequency in the squared frequency characteristics is calculated as the NBSNR of squared wobble signal, and that NBSNR of squared wobble signal is evaluated, accurate performance of the wobble signal can be recognized. Also, since this NBSNR of squared wobble signal assumes a value obtained by subtracting about 6 dB from the NBSNR of the wobble signal before squaring, the NBSNR can be estimated by adding 6 dB to the measured NBSNR of squared wobble signal. However, when the NBSNR of squared wobble signal is measured using a circuit, a difference of around 7 dB appears due to the influence of noise and the like.

In addition, the NBSNR of squared wobble signal allows performance evaluation of the wobble signal in more detail than the normal NBSNR. Normally, in the performance evaluation of a modulated wobble signal, the phase difference between symbols must be evaluated in addition to the aforementioned NBSNR of a carrier. This is for the following reason. For example, upon demodulating a binary phase-modulated wobble signal in which the phase difference between symbols is about 180°, if the phase difference of an actual wobble signal is reduced to be equal to or smaller than 180°, the demodulation error rate upon demodulation increases.

Figure 17:
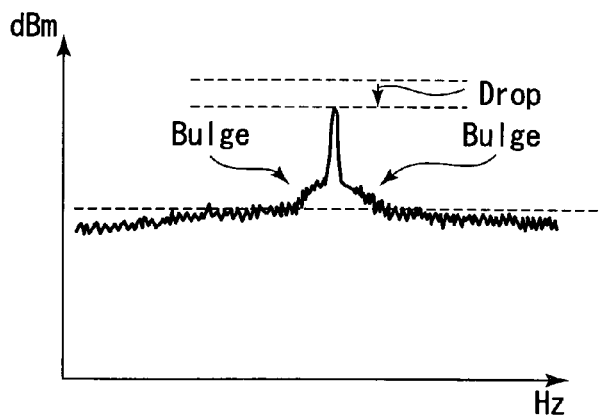
FIG. 17 is a graph showing an example of the frequency characteristics of a squared wobble signal obtained by squaring a locally modulated wobble signal when the phase difference of the wobble signal is reduced to about 160°.

FIG. 17 shows the frequency characteristics of a squared wobble signal obtained by squaring a locally modulated wobble signal when the phase difference of the wobble signal is reduced to about 160°. If the phase difference is 180°, a carrier frequency can be extracted from modulated components by squaring, as shown in FIG. 15 or 16. However, if the phase difference deviates from 180°, a carrier frequency cannot be perfectly extracted. As a result, a peak slightly lowers, as shown in FIG. 17, and small bulges are generated near the peak. As a result, the measured NBSNR of squared wobble signal lowers. Hence, the deviation of the phase difference between symbols can be estimated from the drop of the NBSNR of squared wobble signal. In this way, the NBSNR of squared wobble signal can evaluate not only a decrease in amplitude of basic components but also the phase difference of modulated components at the same time.

Figure 18:
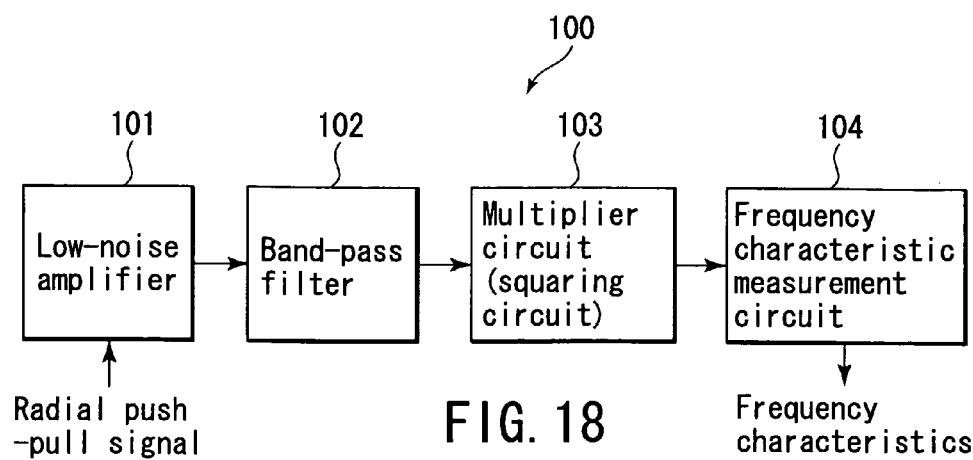
FIG. 18 is a block diagram showing an example of a measurement unit which measures the NBSNR of a wobble signal.

FIG. 18 is a block diagram showing an example of a measurement unit which measures the NBSNR of a wobble signal obtained in correspondence with the wobbled track, which is wobbled in correspondence with a phase-modulated frequency. As shown in FIG. 18, a measurement unit 100 comprises a low-noise removal/amplifier 101, band-pass filter 102, multiplier circuit (squaring circuit) 103, and frequency characteristic measurement circuit (spectrum analyzer) 104. By combining the measurement unit 100 shown in FIG. 18 and the optical disk apparatus shown in FIG. 1, a reproduction signal evaluation apparatus shown in FIG. 19 can be formed. For example, when this measurement unit 100 is connected to the optical disk apparatus so that the output from the preamplifier 60 shown in FIG. 1 is input to the low-noise removal/amplifier 101 of the measurement unit 100, and the output from the frequency characteristic measurement circuit 104 of the measurement unit 100 is input to the controller 10 shown in FIG. 1, the reproduction signal evaluation apparatus shown in FIG. 19 can be formed.

That is, the low-noise removal/amplifier 101 of the reproduction signal evaluation apparatus receives a radial push-pull signal, i.e., a wobble signal, output from the preamplifier 60. The low-noise removal/amplifier 101 removes the DC component contained in the wobble signal, and appropriately amplifies the wobble signal. Then, the low-noise removal/amplifier 101 supplies this wobble signal to the band-pass filter 102. The band-pass filter 102 removes extra frequency components contained in the received wobble signal, and supplies that wobble signal to the multiplier circuit 103. Note that the extra frequency components mean frequency components sufficiently separated from the carrier frequency. The squaring circuit 103 squares (double-multiplies) the received wobble signal to generate, e.g., a squared wobble signal, and supplies this squared wobble signal to the frequency characteristic measurement circuit 104. The frequency characteristic measurement circuit 104 measures the NBSNR of the squared wobble signal.

Furthermore, in order to accurately measure the NBSNR of squared wobble signal, this measurement unit has the following features. The first feature lies in the frequency band of the low-noise removal/amplifier 101 and multiplier circuit 103. The low-noise removal/amplifier 101 and multiplier circuit 103 have a frequency band six times or more the carrier frequency of the wobble signal to be measured, as shown in FIG. 20. More specifically, if the carrier frequency of the wobble signal is about 700 kHz, a frequency at which the amplitude (level) ratio of the input and output signals in the low-noise removal/amplifier 101 and multiplier circuit 103 lowers 3 dB is around 4 MHz to 5 MHz.

Figure 21:
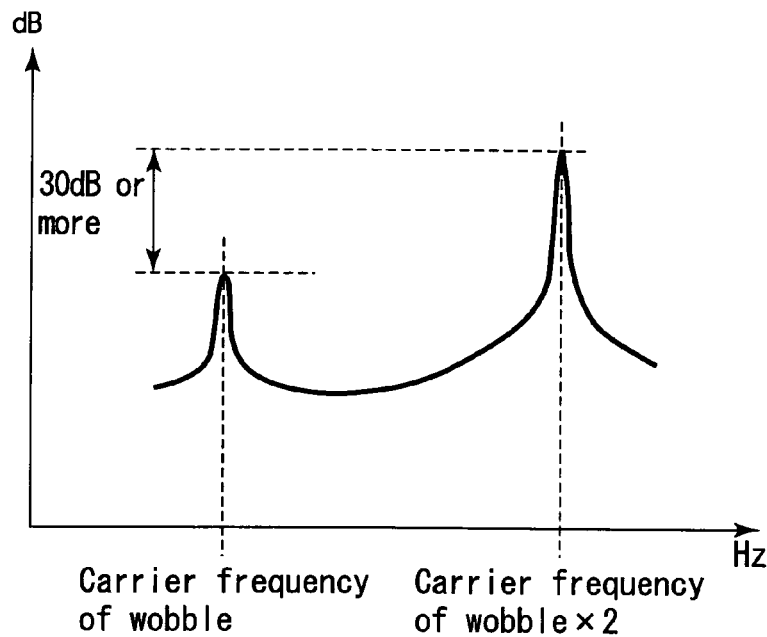
FIG. 21 is a graph showing an example of the relationship between a peak value of the carrier frequency of a frequency-double wobble signal, and a peak value which is generated at a frequency twice the carrier frequency.

The second feature lies in the residual level in carrier components contained in the squared wobble signal. When an ideal sine wave is squared, peak levels which appear at predetermined frequencies ($f_1$, $f_2$, $f_3$) in this sine wave appear at frequencies ($2 \times f_1$, $2 \times f_2$, $2 \times f_3$) twice the predetermined frequencies in the squared signal. That is, a peak level at a predetermined frequency obtained from the frequency characteristics of a wobble signal appears at a frequency twice the predetermined frequency in the frequency characteristics of the squared wobble signal. However, in practice, due to the residual noise or DC component of the wobble signal, not only a peak level appears only at the frequency twice the carrier frequency but also a peak level (residual peak level) corresponding to the residual level of the carrier frequency appears. This peak level corresponding to the residual level of the carrier frequency becomes noise in measurement of the NBSNR of squared wobble signal. For this reason, the frequency characteristic measurement circuit 104 must sufficiently reduce such residual carrier component. Hence, as shown in FIG. 21, the frequency characteristic measurement circuit 104 sets the peak level which appears in correspondence with the residual level of the carrier frequency of the squared signal to be 30 dB or more lower than the original peak level which appears at the frequency twice the carrier frequency. In other words, the circuit characteristics such as the frequency characteristics, delay, and the like are adjusted so that the residual peak level becomes 30 dB or more lower than the original peak level which appears at the frequency twice the predetermined frequency. More specifically, the difference between the first and second peaks of an output signal upon inputting an ideal sine wave becomes 30 dB or more. In this way, the NBSNR of squared wobble signal can be accurately measured.

The third feature lies in the amplitude decreasing rate after squaring. Normally, when a sine wave is squared, its amplitude is nearly halved. Hence, the CNR apparently lowers about 6 dB. However, if the circuit has poor delay and frequency characteristics, the decreasing amount of the amplitude after squaring increases. If this decreasing amount is large, it becomes difficult to accurately measure the NBSNR of squared wobble signal. Therefore, upon reception of a single-frequency wobble signal or an input signal obtained by adding a noise component to an ideal sine wave, the frequency characteristic measurement circuit 104 is adjusted so that the difference between the NBSNR of original signal and NBSNR of squared signal values is 7 dB or less. That is, upon inputting a non-modulated sine wave with the NBSNR=30 dB, the NBSNR of squared sine signal becomes 23 dB or more. By satisfying at least one of the aforementioned three features, the NBSNR of squared signal can be accurately measured.

Figure 22:
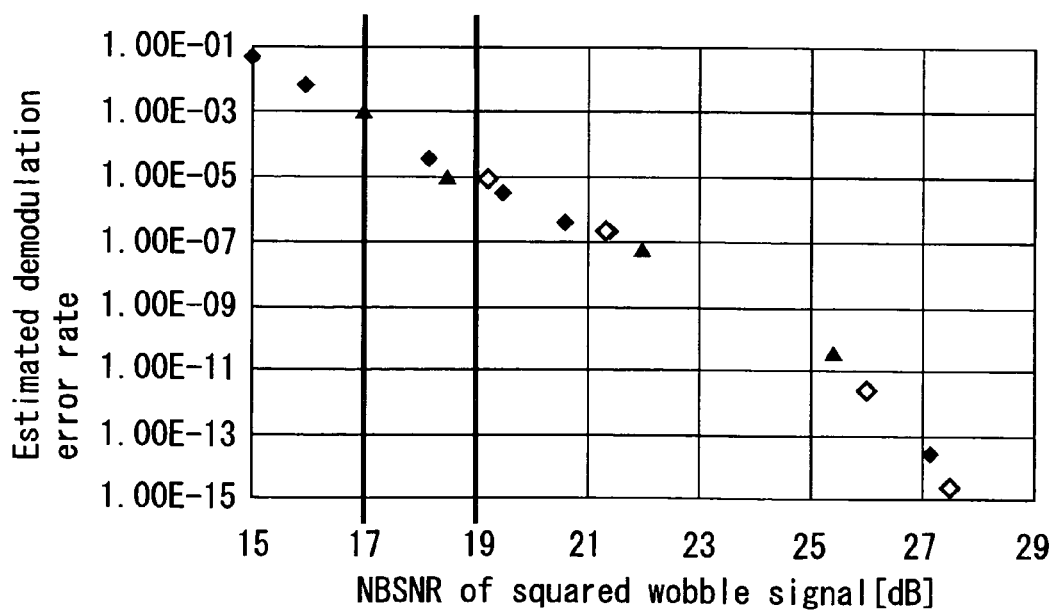
FIG. 22 is a graph showing an example of the relationship between the measurement result of the NBSNR of squared wobble signal and the modulation error rate of a modulated wobble signal.

FIG. 22 shows the relationship between the measurement result of the NBSNR of squared wobble signal, and the demodulation error rate of the modulated wobble signal. The demodulation error rate of the wobble signal is measured by, e.g., the address information processing unit shown in FIGS. 1 and 10, and the NBSNR of squared wobble signal is measured by, e.g., the measurement unit shown in FIG. 18.

When physical address information or the like is to be acquired from the wobble signal, it is generally required that the demodulation error rate of a wobble signal is $1.0 \times 10^{-3}$ or less. If demodulation errors more than this error rate have occurred, the address information cannot be accurately read out. As a result, it may become impossible to read out user information, and information may be recorded at a wrong recording destination (address). Conversely, if the demodulation error rate is $1.0 \times 10^{-3}$ or less, a physical address can be nearly accurately specified by error correction or confirming continuity of neighboring addresses.

As can be seen from FIG. 22, in order to assure a demodulation error rate of $1.0 \times 10^{-3}$ or more, a minimum of a NBSNR of squared wobble signal of 17 dB or more is required. At this time, the NBSNR before squaring requires about 23 dB to 24 dB. More specifically, when the NBSNR of squared wobble signal of the frequency characteristics obtained from the wobbled track of the information storage medium shown in FIG. 3 is 17 dB or more, physical addresses can be accurately specified on this information storage medium.

Upon measuring the NBSNR of squared wobble signal, a measurement circuit may cause an error or read error of around 1 dB. For this reason, a NBSNR of squared wobble signal of 18 dB or more is preferably assured as a measured value. That is, when the measurement result of the squared wobble signal's NBSNR of the frequency characteristics obtained from the wobbled track of the information storage medium shown in FIG. 3 is 18 dB or more, an actual NBSNR of squared wobble signal of 17 dB or more can be reliably assured even when a read error or the like occurs. Hence, physical addresses can be accurately specified on this information storage medium.

Upon reflecting address information or the like on the wobble signal, it is often difficult to reflect error correction codes together with the address information or it is often required to determine the read accuracy of a single physical address without regarding the continuity of neighboring addresses so as to improve the access speed. In such case, a demodulation error rate of $1.0 \times 10^{-5}$ or less must be assured. The relationship in FIG. 22 reveals that a NBSNR of squared wobble signal of 19 dB or more is required to assure a demodulation error rate of $1.0 \times 10^{-5}$ or less. That is, when the NBSNR of squared wobble signal of the frequency characteristics obtained from the wobbled track of the information storage medium shown in FIG. 3 is 19 dB or more, physical addresses can be accurately assured and high-speed access to a desired address is allowed on this information storage medium, even when this information storage medium has no error correction codes.

Figure 23:
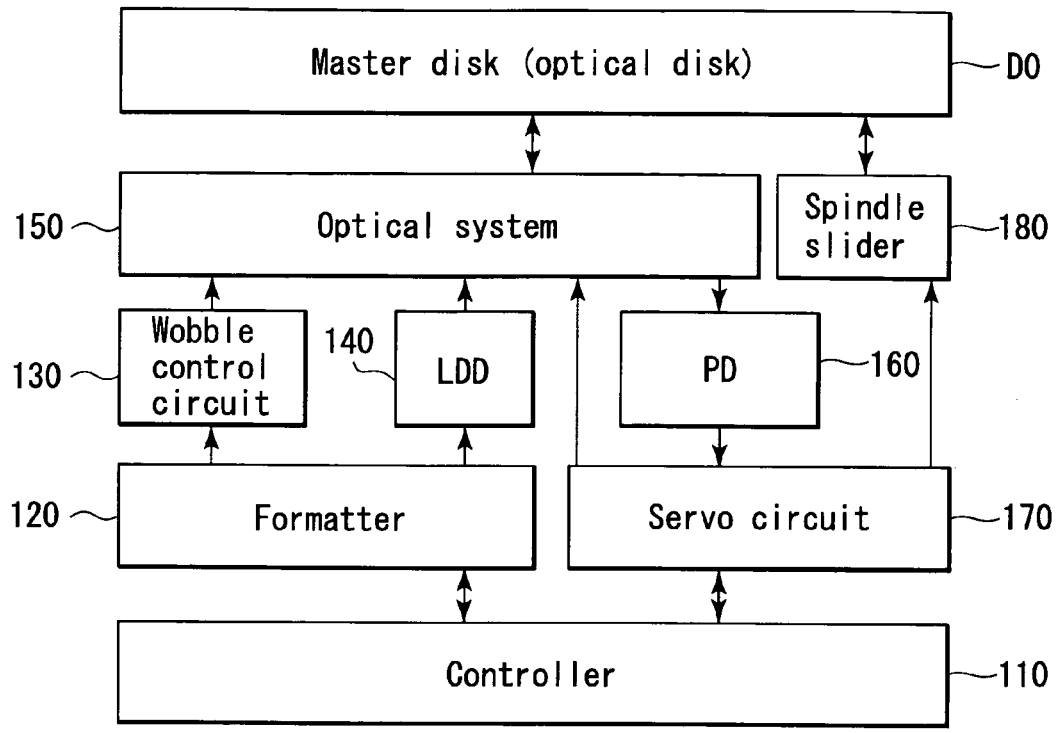
FIG. 23 is a block diagram showing an example of a mastering apparatus.

FIG. 23 is a block diagram showing an example of a mastering apparatus as a part of a manufacturing system for manufacturing the information storage medium shown in FIG. 3. The optical disk of the present invention is fabricated in master disk preparation, stamper preparation, molding, medium film formation, and adhesion processes. In the master disk preparation process, a regist is applied to a flat master disk D0, and is exposed by the mastering apparatus shown in FIG. 23. Furthermore, the exposed regist is removed by development, thus preparing a master disk having the same three-dimensional pattern as that of the information recording layer of the final optical disk medium. In the stamper preparation process, Ni plating or the like is applied to the master disk to form a sufficiently thick metal disk, and the master disk is peeled to prepare a stamper. At this time, the three-dimensional pattern formed on the stamper is inverted to that formed on the master disk. In the molding process, a resin such as polycarbonate or the like is poured using the stamper as a mold, thus molding a substrate. The three-dimensional pattern on the surface of the molded substrate is obtained by copying that of the stamper, i.e., the substrate has substantially the same three-dimensional pattern as that of the master disk. Next, a film of a recording material is formed on this three-dimensional pattern by sputtering or the like, and another substrate is adhered to that substrate to protect the formed film, thus completing an optical disk D1. That is, the wobbled track D13 is recorded by the mastering apparatus shown in FIG. 23.

As shown in FIG. 23, the mastering apparatus comprises a controller 110, formatter 120, wobble control circuit 130, laser driver (LDD) 140, optical system unit 150, photodetector (PD) 160, servo circuit 170, and spindle slider 180.

Figure 24:
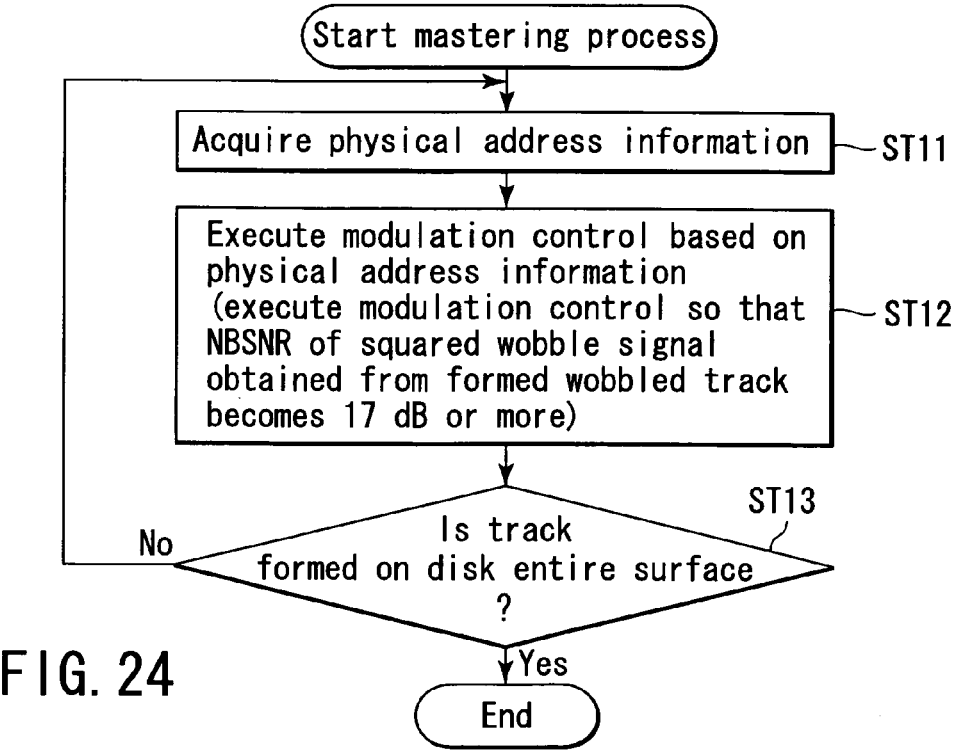
FIG. 24 is a flow chart showing an example of a mastering process by the mastering apparatus.

FIG. 24 is a flow chart showing an overview of the mastering process by the mastering apparatus. The controller 110 controls the overall mastering process. The formatter 120 acquires physical address information (ST11). Based on a signal output from this formatter 120 to the LDD 140, the amount of a laser beam emitted by the optical system unit 150 is controlled. The laser beam passes through an AO modulator, objective lens, and the like included in the optical system unit 150, and strikes the master disk D0. Focusing, tracking, and the like of the irradiated beam, rotation of the disk, and the like are controlled by the servo circuit 170. A portion irradiated with the laser beam on the master disk D0 is exposed, and becomes a guide groove (groove track) or the like.

The formatter 120 outputs a signal to the wobble control circuit 130 on the basis of physical address information and the like to be recorded on the optical disk. The wobble control circuit 130 can slightly move the spot of the beam that strikes the master disk in the radial direction by controlling the AO modulator and the like in the optical system unit. That is, the wobble control circuit 130 controls the AO modulator and the like in the optical system unit so that the NBSNR of squared wobble signal NBSNR obtained from a wobbled track formed on the disk becomes 17 dB or more (ST12). Steps ST11 and ST12 are repeated until the wobbled track is formed on the entire surface of the disk (ST13). The optical disk prepared by the aforementioned mastering process becomes an information storage medium from which physical addresses can be accurately read.

Figure 25:
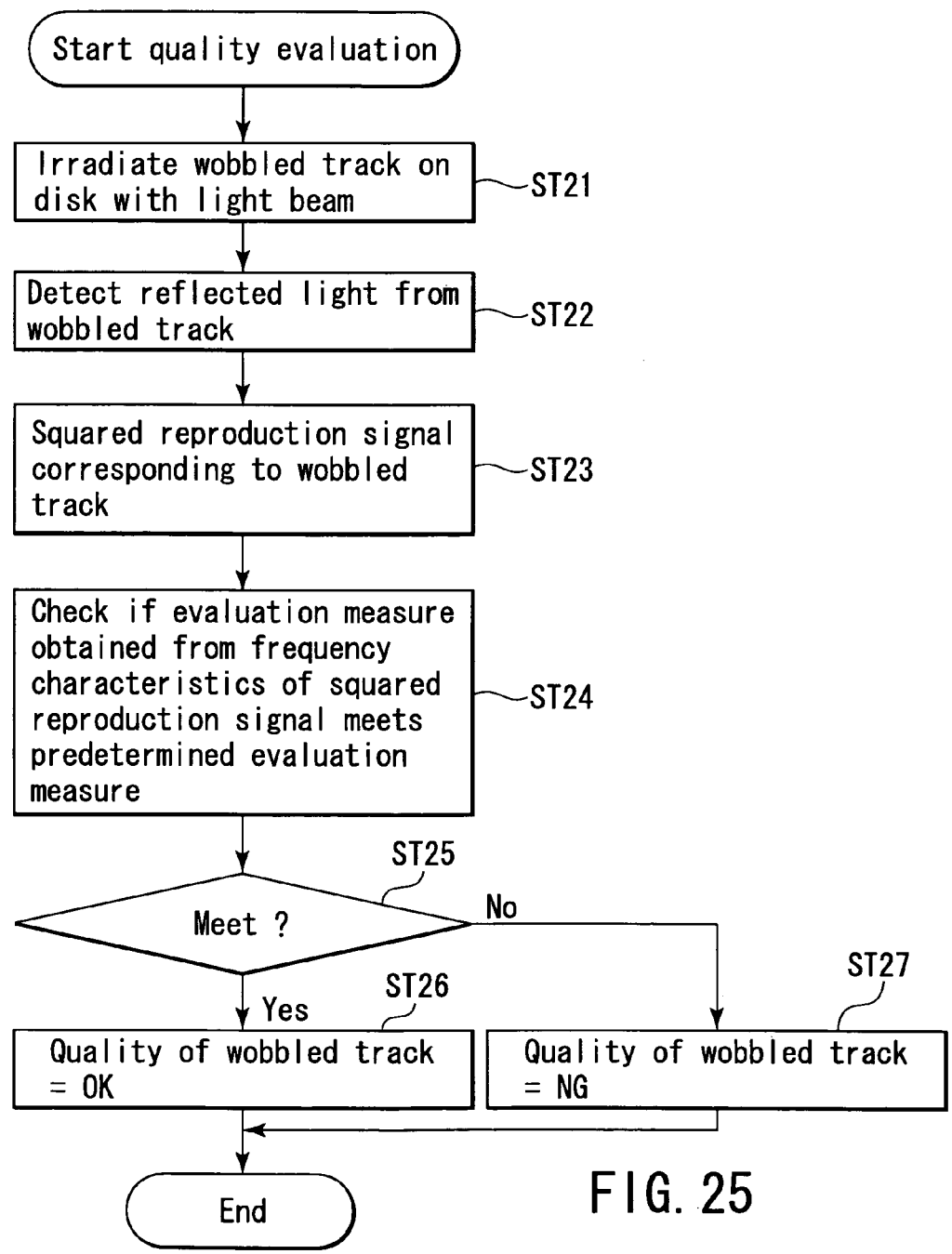
FIG. 25 is a flow chart showing an example of a quality evaluation process of a reproduction signal by the reproduction signal evaluation apparatus.

Next, quality evaluation of a reproduction signal by the reproduction signal evaluation apparatus will be explained below with reference to FIG. 25. As described above, the reproduction signal evaluation apparatus is formed by combining the measurement unit shown in FIG. 18 and the optical disk apparatus shown in FIG. 1. The PUH 40 irradiates the wobbled track D13 of the optical disk D1 with a light beam (ST21). The PD 50 detects light reflected by the wobbled track D13 (ST22). A radial push-pull signal generated from the signal detected by the PD 50, i.e., a wobble signal, is input to the measurement unit shown in FIG. 18. The squaring circuit 103 of the measurement unit squares the wobble signal (ST23). The frequency characteristic measurement circuit 104 checks based on the frequency characteristics of a squared wobble signal if the evaluation result of this squared wobble signal meets a predetermined evaluation measure (ST24). That is, it is determined whether or not the difference (NBSNR of squared wobble signal) between the peak and noise levels obtained from the frequency characteristics of the squared wobble signal is 17 dB or more. If the predetermined evaluation measure is met, i.e., if the NBSNR of squared wobble signal is 17 dB or more (ST25, YES), it is determined that the quality of the wobbled track poses no problems (ST26). Hence, physical addresses can be accurately read from the wobbled track of this optical disk. Conversely, if the predetermined evaluation measure is not met, i.e., if the NBSNR of squared wobble signal is less than 17 dB (ST25, NO), it is determined that the quality of the wobbled track may pose problems (ST27). Hence, physical addresses may not be accurately read from the wobbled track of this optical disk.

Figure 26:
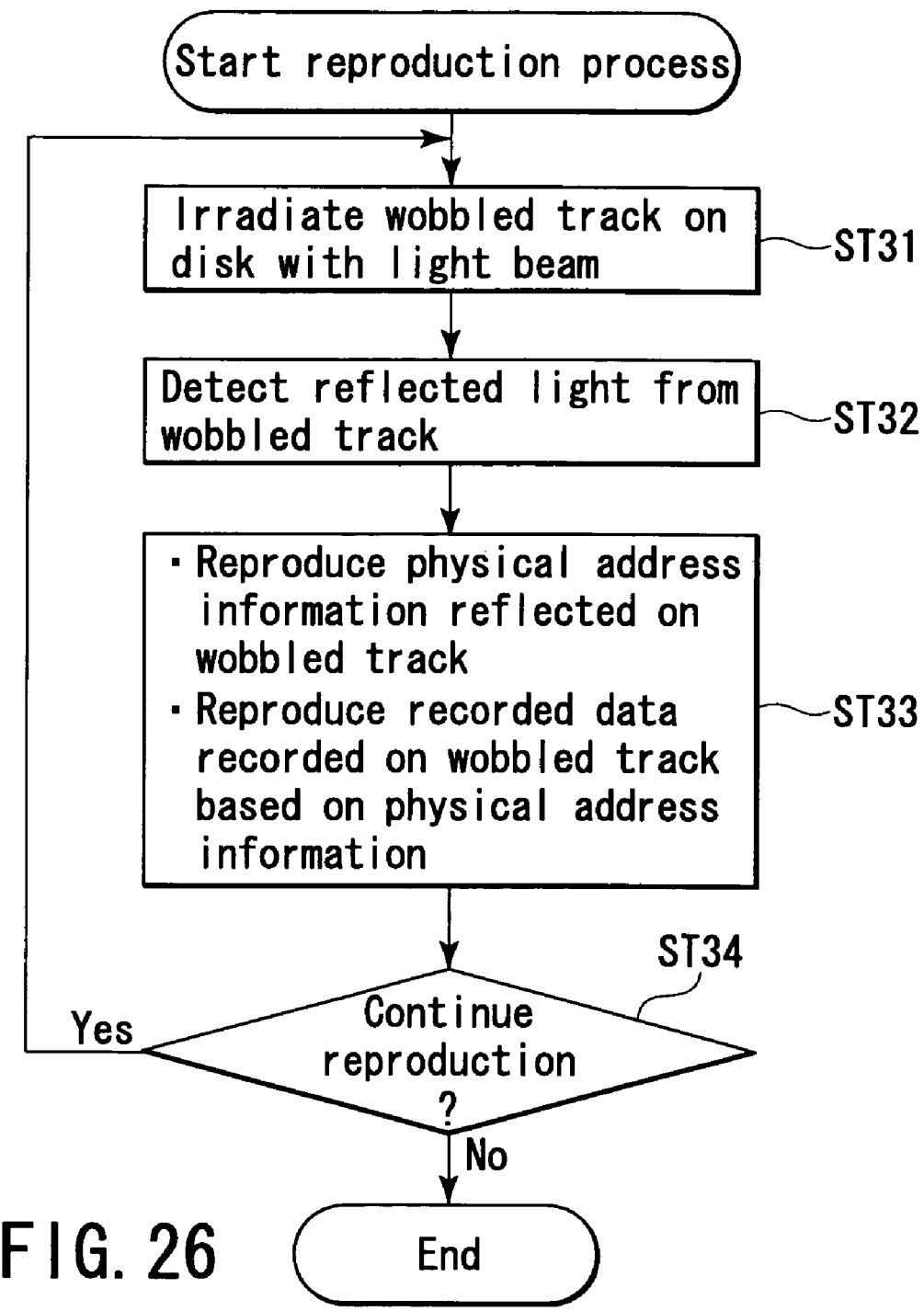
FIG. 26 is a flow chart for explaining an example of a reproduction process of the optical disk apparatus.

The reproduction process by the optical disk apparatus shown in FIG. 1 will be described below with reference to FIG. 26. An optical disk which is to undergo the reproduction process is a disk which is prepared via the aforementioned mastering process, and is determined by the reproduction signal quality evaluation process that the quality of its wobbled track poses no problems. The PUH 40 irradiates the wobbled track D13 of the optical disk D1 with a light beam (ST31). The PD 50 detects light reflected by the wobbled track D13 (ST32). A radial push-pull signal generated from the signal detected by the PD 50, i.e., a wobble signal, is input to the address signal processing unit 90. On the other hand, a sum signal generated from the signal detected by the PD 50, i.e., an RF signal, is input to the RF signal processing circuit 80. The address signal processing unit 90 reproduces physical address information on the basis of the wobble signal (ST33). The RF signal processing circuit 80 reproduces recorded data on the basis of the RF signal. This optical disk is a disk which is prepared via the aforementioned mastering process, and is determined by the reproduction signal quality evaluation process that the quality of its wobbled track poses no problems. Hence, since a correct address is read out from the wobbled track of this optical disk, target information can be accurately readout. Steps ST31 to ST33 are repeated until the reproduction process of target data is completed (ST34).

Figure 27:
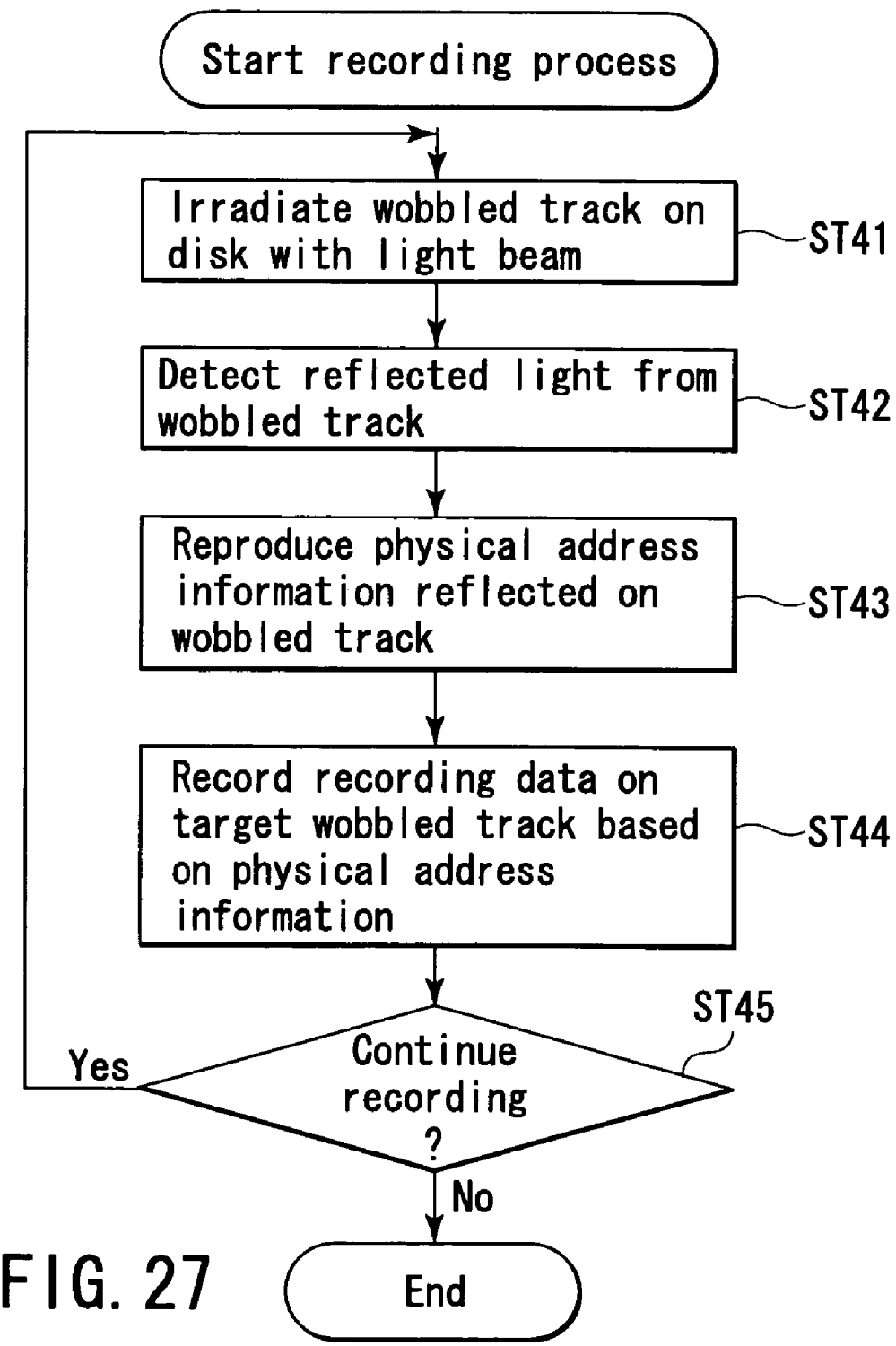
FIG. 27 is a flow chart for explaining an example of a recording process of the optical disk apparatus.

The recording process by the optical disk apparatus shown in FIG. 1 will be described below with reference to FIG. 27. An optical disk which is to undergo the reproduction process is a disk which is prepared via the aforementioned mastering process, and is determined by the reproduction signal quality evaluation process that the quality of its wobbled track poses no problems. The PUH 40 irradiates the wobbled track D13 of the optical disk D1 with a light beam (ST41). The PD 50 detects light reflected by the wobbled track D13 (ST42). A radial push-pull signal generated from the signal detected by the PD 50, i.e., a wobble signal, is input to the address signal processing unit 90. The address signal processing unit 90 reproduces physical address information on the basis of the wobble signal (ST43). Based on the reproduced physical address information, a target recording position is recognized, and the PUH 40 records recording data at the recognized target recording position (ST44). This optical disk is a disk which is prepared via the aforementioned mastering process, and is determined by the reproduction signal quality evaluation process that the quality of its wobbled track poses no problems. Hence, since a correct address is read out from the wobbled track of this optical disk, target recording data can be accurately recorded at a target position. Steps ST41 to ST44 are repeated until the recording process of target data is completed (ST45).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information storage medium evaluation apparatus for evaluating an information storage medium, which comprises a wobbled track that is used to guide a light beam and is wobbled in correspondence with a frequency, a phase of which is modulated at predetermined timings to reflect predetermined information, comprising:

a detection unit configured to detect reflected light of the light beam with which the wobbled track formed on the information storage medium is irradiated;

a filter unit configured to suppress noise from a reproduction signal corresponding to the wobbled track on the basis of the reflected light detected by the detection unit;

a squaring unit configured to square the reproduction signal from which the noise is suppressed by the filter unit; and an evaluation unit configured to evaluate a quality of the wobbled track on the basis of frequency characteristics of the squared reproduction signal squared by the squaring unit, wherein when the squaring unit squares a predetermined sine wave and outputs the squared sine wave, a peak level at a predetermined frequency obtained from frequency characteristics of the sine wave appears at a frequency twice the predetermined frequency in frequency characteristics of the squared sine wave, and the evaluation unit has characteristics that set a residual peak level corresponding to a residual level in the predetermined frequency obtained from the frequency characteristics of the squared sine wave to be lower by not less than 30 dB than a peak level that appears at the frequency twice the predetermined frequency.

2. An information storage medium evaluation apparatus for evaluating an information storage medium, which comprises a wobbled track that is used to guide a light beam and is wobbled in correspondence with a frequency, a phase of which is modulated at predetermined timings to reflect predetermined information, comprising:

a detection unit configured to detect reflected light of the light beam with which the wobbled track formed on the information storage medium is irradiated;

a filter unit configured to suppress noise from a reproduction signal corresponding to the wobbled track on the basis of the reflected light detected by the detection unit;

a squaring unit configured to square the reproduction signal from which the noise is suppressed by the filter unit; and an evaluation unit configured to evaluate a quality of the wobbled track on the basis of frequency characteristics of the squared reproduction signal squared by the squaring unit, wherein when the squaring unit multiplies a predetermined sine wave containing a noise component and outputs the squared sine wave, a peak level at a predetermined frequency obtained from frequency characteristics of the sine wave appears at a frequency twice the predetermined frequency in frequency characteristics of the squared sine wave, and the evaluation unit has characteristics that set a difference between a first difference between peak and noise levels obtained from the frequency characteristics of the sine wave and a second difference between peak and noise levels obtained from the frequency characteristics of the squared sine wave to be not more than 7 dB.

3. An information storage medium for storing information, comprising:

an information storage area for storing information; and a wobbled track which is used to guide a light beam on the information storage area, and is wobbled in correspondence with a frequency, a phase of which is modulated at predetermined timings to reflect predetermined information, wherein the wobbled track is formed so that when a reproduction signal corresponding to the wobbled track obtained from reflected light of the light beam, with which the wobbled track is irradiated, is squared, and the squared reproduction signal is evaluated on the basis of frequency characteristics of the squared reproduction signal, a difference between peak and noise levels obtained from the frequency characteristics of the squared reproduction signal becomes not less than 17 dB, and the wobbled track is formed so that a peak level at a predetermined frequency obtained from frequency characteristics of the reproduction signal appears at a frequency twice the predetermined frequency in the frequency characteristics of the squared reproduction signal, and a residual peak level corresponding to a residual level in the predetermined frequency obtained from the frequency characteristics of the squared reproduction signal is lower by not less than 30 dB than the peak level, which appears at the frequency twice the predetermined frequency.

4. An information storage medium evaluation method for evaluating an information storage medium, which comprises a wobbled track that is used to guide a light beam and is wobbled in correspondence with a frequency, a phase of which is modulated at predetermined timings to reflect predetermined information, comprising:

detecting reflected light of the light beam with which the wobbled track formed on the information storage medium is irradiated;

suppressing noise from a reproduction signal corresponding to the wobbled track on the basis of the reflected light;

squaring the reproduction signal from which the noise is suppressed; and evaluating a quality of the wobbled track on the basis of frequency characteristics of the squared reproduction signal, wherein when the squaring process squares a predetermined sine wave and outputs the squared sine wave, a peak level at a predetermined frequency obtained from frequency characteristics of the sine wave appears at a frequency twice the predetermined frequency in frequency characteristics of the squared sine wave, and the evaluating process has characteristics that set a residual peak level corresponding to a residual level in the predetermined frequency obtained from the frequency characteristics of the squared sine wave to be lower by not less than 30 dB than a peak level that appears at the frequency twice the predetermined frequency.

5. An information storage medium evaluation method for evaluating an information storage medium, which comprises a wobbled track that is used to guide a light beam and is wobbled in correspondence with a frequency, a phase of which is modulated at predetermined timings to reflect predetermined information, comprising:

detecting reflected light of the light beam with which the wobbled track formed on the information storage medium is irradiated;

suppressing noise from a reproduction signal corresponding to the wobbled track on the basis of the reflected light;

squaring the reproduction signal from which the noise is suppressed; and evaluating a quality of the wobbled track on the basis of frequency characteristics of the squared reproduction signal, wherein when the squaring process multiplies a predetermined sine wave containing a noise component and outputs the squared sine wave, a peak level at a predetermined frequency obtained from frequency characteristics of the sine wave appears at a frequency twice the predetermined frequency in frequency characteristics of the squared sine wave, and the evaluating process has characteristics that set a difference between a first difference between peak and noise levels obtained from the frequency characteristics of the sine wave and a second difference between peak and noise levels obtained from the frequency characteristics of the squared sine wave to be not more than 7 dB.

6. An information storage medium for storing information, comprising:

an information storage area for storing information; and a wobbled track which is used to guide a light beam on the information storage area, and is wobbled in correspondence with a frequency, a phase of which is modulated at predetermined timings to reflect predetermined information, wherein the wobbled track is formed so that when a reproduction signal corresponding to the wobbled track obtained from reflected light of the light beam, with which the wobbled track is irradiated, is squared, and the squared reproduction signal is evaluated on the basis of frequency characteristics of the squared reproduction signal, a difference between peak and noise levels obtained from the frequency characteristics of the squared reproduction signal becomes not less than 17 dB, and the wobbled track is formed so that a peak level at a predetermined frequency obtained from frequency characteristics of the sine wave appears at a frequency twice the predetermined frequency in frequency characteristics of the squared sine wave, and a difference between a first difference between peak and noise levels obtained from the frequency characteristics of the sine wave and a second difference between peak and noise levels obtained from the frequency characteristics of the squared sine wave is not more than 7 dB.

* * * * *